2,845,141
ACCESSORY OILING SYSTEM

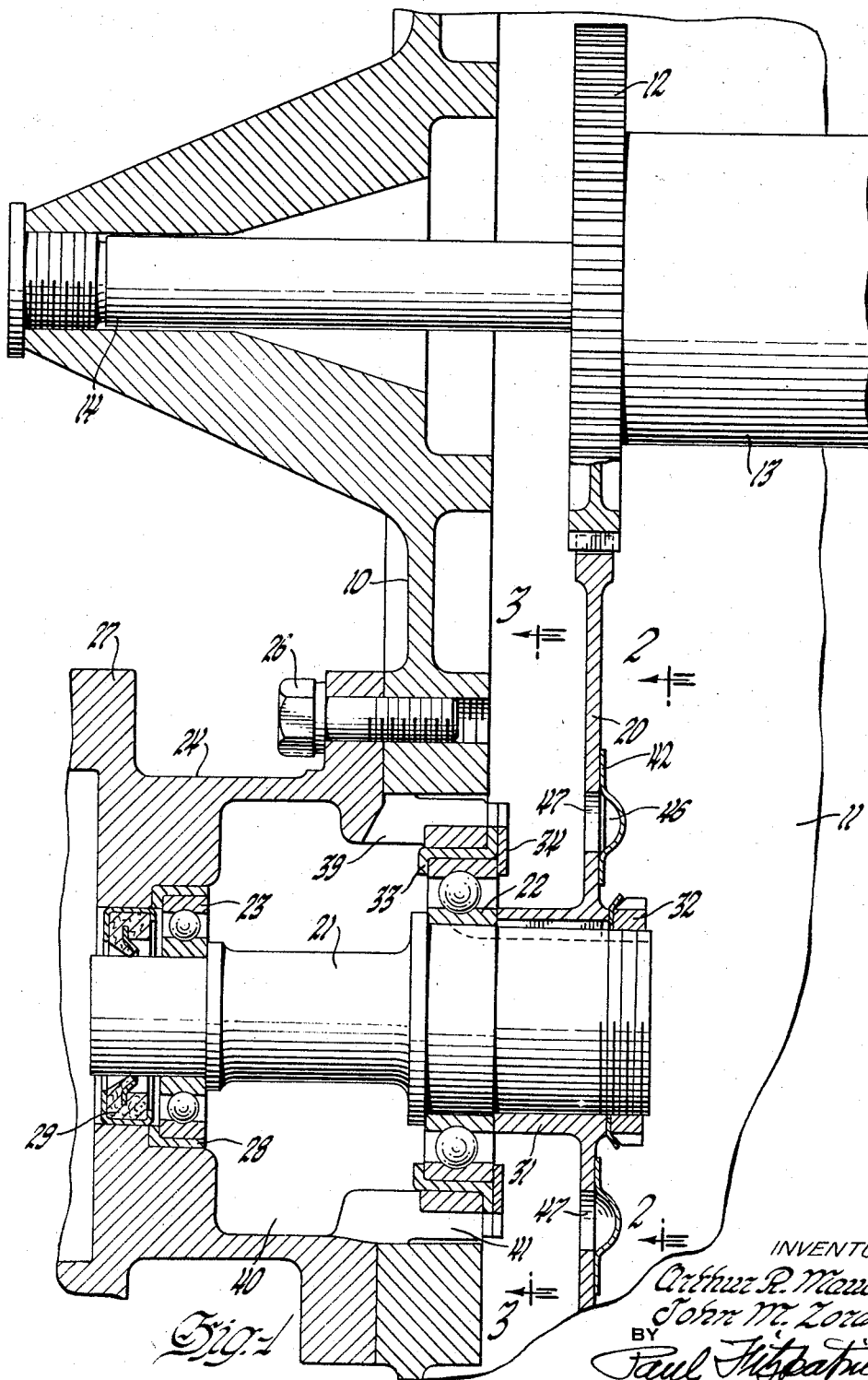

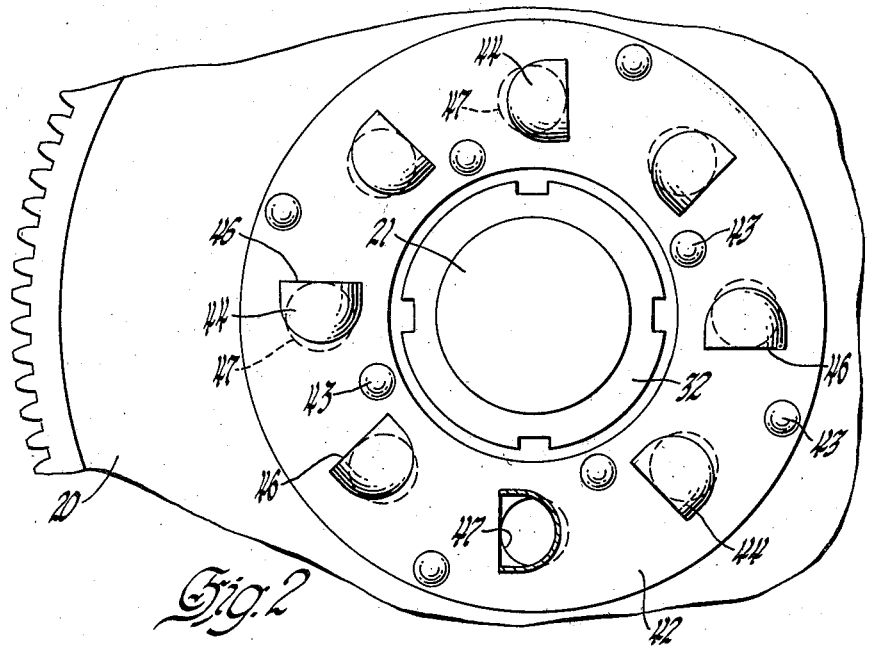
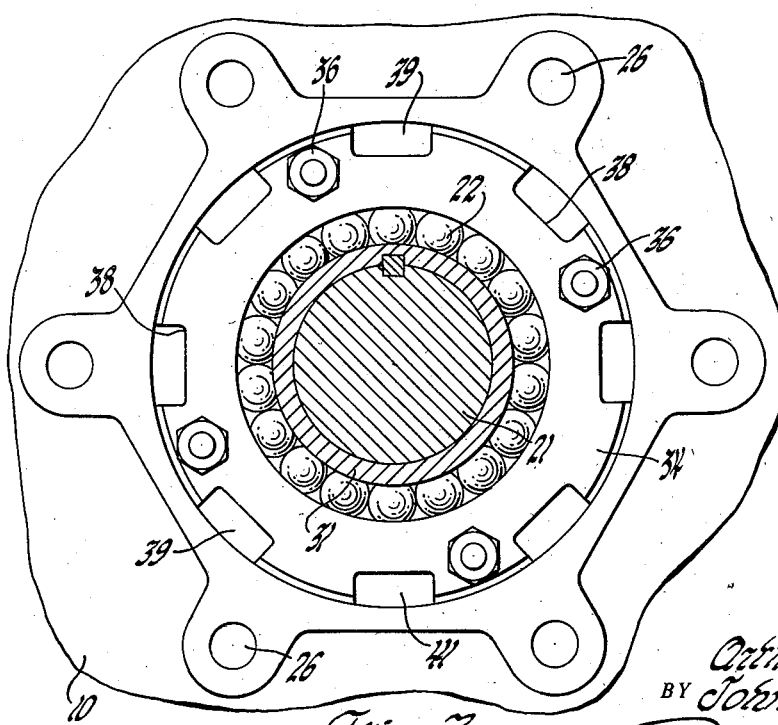

Arthur R. Mauck, Indianapolis, and John M. Zorad, Danville, Ind., assignors to General Motors Corporation, Detroit, Mich., a corporation of Delaware Application November 30, 1955, Serial No. 550,044

1 Claim. (Cl. 184—6)

Our invention relates to lubricating systems and particular to means for lubricating a bearing which supports a shaft in an engine accessory drive case or analogous structure.

Many engine gearing arrangements are mounted in cases in which oil is churned up or otherwise nebulized or diffused so that the case contains a mist or fog of oil in air which may serve to lubricate all or part of the mechanism. Where parts are not satisfactorily exposed to this oil mist or require more intensive lubrication, pressure oiling systems may be employed.

The particular invention here described is directed to an arrangement for securing adequate oiling of a bearing which is mounted in a recess or chamber so that, without special attention to the bearing, it would not be adequately lubricated by the mist in the case.

In general, the invention involves providing a small fan or impeller, which may be mounted on a gear, and which propels oil into the chamber in which the bearing is mounted.

The nature of the invention and the advantages thereof will be more clearly apparent to those skilled in the art from the succeeding detailed description of the preferred embodiment of the invention and the accompanying drawings in which:

Figure 1 is a fragmentary sectional view of part of a turbojet engine accessory drive case;

Figure 2 is a partial sectional view taken on the plane indicated by the line 2—2 in Figure 1; and Figure 3 is a partial sectional view taken on the plane indicated by the line 3—3 in Figure 1.

Accessory drive cases for turbojet engines being well known, there is no need to show an entire case. Such cases provide for a connection from the turbine of the engine to auxiliaries such as a starter, oil pumps, electrical generators, a tachometer, etc. The structure illustrated in Figures 1, 2 and 3 constitutes a part of the gear train of such accessory drive box which may be adapted to drive a particular engine accessory, such as a generator for aircraft service.

Referring now to the drawings, the wall 10 is one wall of an accessory case or housing which defines a chamber 11 within which various gears are mounted. These gears may include a main drive gear 12 on a shaft 13 which may be suitably coupled by means not shown to the turbine. A tube 14 may provide for an external lubricating oil connection into shaft 13. The bearings and other supports for shaft 13 are not illustrated. Gear 12 drives a gear 20 which is keyed to a shaft 21 mounted in a first bearing 22 and a second bearing 23. Bearing 22 is mounted in the plane of the wall 10 in the open end of a cup-shaped extension 24 of the case secured to the wall 10 by cap screws 26. Bearing 23 is mounted in the closed end of extension 24 remote from wall 10. The flange 27 may serve to mount the driven device which may be coupled to the shaft 21 by splines in the shaft (not shown).

Bearing 23 abuts a shoulder on shaft 21 and is mounted in a cage 28 in the casing extension 24. An oil seal 29 may be provided. The inner race of bearing 22 is mounted between a shoulder on shaft 21 and the hub 31 of gear 20, which may be retained by a spanner nut 32 on the threaded end of the shaft. The outer race of bearing 22 is mounted in a cage comprising a cup 33 and a plate 34 which are held on the extension 24 by nuts 36 on studs extending from the extension. Notches 38 distributed around the periphery of the cage parts 33 and 34 register with openings 39 through the extension 24, which openings serve to admit oil mist into the chamber 40 within which bearing 23 is mounted. The lowest opening 41 serves for drainage of oil from the chamber 40.

Because of the rather remote location of bearing 23 in a pocket, adequate lubrication would not be effected merely by the provision of the openings 39 and 41. Therefore, an impeller, which advantageously is a simple structure incorporated in the gear 20, is provided to assure adequate circulation of the oil mist to the bearing.

Referring to Figures 1 and 2, the impeller consists of a sheet metal ring 42 secured to the gear by rivets 43 and including expanded or scoop-like portions 44. Each of these scoops 44 defines an opening 46 facing into the direction of rotation of gear 20 and each scoop overlies a hole 47 in the web of gear 20.

As will be apparent, this structure provides a fan or axial impeller which projects a current of air laden with oil through the openings 39 into the chamber or pocket 40. While other structures might be employed for the purpose, the simple struck out sheet metal structure riveted to the web of the gear, in connection with the holes through the gear, is both adequate and simple and is light in weight.

Oil separated from the mist and flung against the walls of the cavity 40 by the shaft or bearings will drain through the opening 41 into the case 11 which, as is customary, defines an oil sump or communicates with one. It will be apparent that the principles of the invention may be applied to structures varying from that illustrated herein and that the structure of the impeller and oil passages may be varied to suit individual conditions. The impeller need not necessarily be incorporated in a gear.

The detailed description of the preferred embodiment of the invention, for the purposes of explaining the principles thereof, is not to be construed as limiting or restricting the invention, since many modifications of structure may be made by the exercise of skill in the art within the principles of the invention.

We claim:

In an engine, in combination, a case normally containing oil diffused therein in operation of the engine, a support having a chamber therein, one end of the chamber communicating with the interior of the case through oil inlet openings, a first bearing adjacent the said one end of the chamber, the oil inlet openings being disposed around and adjacent to the first bearing, a second bearing in the chamber remote from the said one end, a shaft mounted in the bearings, a gear disk on the shaft within the case adjacent the first bearing and having holes through the disk adjacent the oil inlet openings, the gear disk including an impeller adapted to propel air with oil diffused therein through the openings into the chamber to lubricate the second bearing, the impeller being defined by scoops mounted on the gear disk overlying the holes through the disk, and means defining an oil drain from the chamber into the case.

References Cited in the file of this patent

UNITED STATES PATENTS

| 1,268,897 | Tresslar | June 11, 1918 |
| 2,379,944 | Willmott | July 10, 1945 |
| 2,489,699 | Clark | Nov. 29, 1949 |
| 2,615,533 | Cliborn | Oct. 28, 1952 |
| 2,618,359 | Alden | Nov. 18, 1952 |